US011284350B2

United States Patent
Jiang

(10) Patent No.: US 11,284,350 B2
(45) Date of Patent: Mar. 22, 2022

(54) METHOD AND DEVICE IN UE AND BASE STATION FOR POWER SAVING

(71) Applicant: Qi Jiang, Shanghai (CN)

(72) Inventor: Qi Jiang, Shanghai (CN)

(73) Assignee: SHANGHAI LANGBO COMMUNICATION TECHNOLOGY COMPANY LIMITED, Shanghai (CN)

(*) Notice: Subject to any disclaimer, the term of this patent is extended or adjusted under 35 U.S.C. 154(b) by 0 days.

(21) Appl. No.: 16/897,288

(22) Filed: Jun. 10, 2020

(65) Prior Publication Data

US 2020/0305082 A1    Sep. 24, 2020

Related U.S. Application Data

(63) Continuation of application No. 16/112,789, filed on Aug. 27, 2018, now Pat. No. 10,750,450.

(30) Foreign Application Priority Data

Aug. 28, 2017  (CN) .......................... 201710748293.5

(51) Int. Cl.
    *H04W 52/02*   (2009.01)
    *H04W 72/04*   (2009.01)
    *H04L 5/00*    (2006.01)

(52) U.S. Cl.
    CPC ....... *H04W 52/0235* (2013.01); *H04W 72/04* (2013.01); *H04L 5/0007* (2013.01)

(58) Field of Classification Search
    CPC combination set(s) only.
    See application file for complete search history.

(56) References Cited

U.S. PATENT DOCUMENTS

2017/0064693 A1    3/2017  Kim et al.
2018/0184379 A1*   6/2018  Liu .................. H04W 52/0219
(Continued)

FOREIGN PATENT DOCUMENTS

CN    104969087 A    10/2015
CN    106034360 A    10/2016
(Continued)

OTHER PUBLICATIONS

CN Office Action in Applcation No. 201710748293.5 dated Feb. 17, 2020.
(Continued)

*Primary Examiner* — Yee F Lam

(57) ABSTRACT

The present disclosure provides a method and a device in a User Equipment (UE) and a base station used for power saving. The UE first determines a first time-frequency resource set and K1 signature sequences, and then monitors the K1 signature sequences in the first time-frequency resource set; if any one of the K1 signature sequences is found in the first time-frequency resource set, the UE is woken up; the K1 signature sequences are used for generating K1 radio signals respectively; the first time-frequency resource set is one of K2 candidate time-frequency resource sets; and at least one of K1 and K2 is greater than 1. According to the present disclosure, the design of the K1 signature sequences effectively reduces the complexity of the UE detecting a wakeup signal, meanwhile, the number of UEs associated with one wakeup signal is flexibly configured.

18 Claims, 9 Drawing Sheets

(56) References Cited

U.S. PATENT DOCUMENTS

| | | | | |
|---|---|---|---|---|
| 2018/0241522 A1* | 8/2018 | Karout | ............... | H04W 74/0816 |
| 2018/0295578 A1* | 10/2018 | Liu | ......................... | H04L 27/04 |
| 2020/0029302 A1* | 1/2020 | Cox | ................. | H04W 56/0015 |
| 2020/0059862 A1* | 2/2020 | Wong | .................... | H04W 76/27 |
| 2021/0127341 A1* | 4/2021 | Yasukawa | ........... | H04W 56/001 |
| 2021/0153120 A1* | 5/2021 | Atungsiri | ............ | H04L 27/2613 |
| 2021/0314865 A1* | 10/2021 | Liu | ................... | H04W 56/0015 |

FOREIGN PATENT DOCUMENTS

| | | | |
|---|---|---|---|
| CN | 106559202 A | 4/2017 | |
| CN | 107005980 A | 8/2017 | |

OTHER PUBLICATIONS

CN Search Report in Application No. 201710748293.5 dated Feb. 25, 2020.
CN Grant Patent Right For Invention dated May 18, 2020.

\* cited by examiner

METHOD AND DEVICE IN UE AND BASE STATION FOR POWER SAVING

This application is a continuation application of U.S. application Ser. No. 16/112,789, filed Aug. 27, 2018, claiming the priority benefit of Chinese Patent Application Serial Number 201710748293.5, filed on Aug. 28, 2017, the full disclosure of which is incorporated herein by reference.

BACKGROUND

Technical Field

The present disclosure relates to transmission methods and devices in wireless communication systems, and in particular to a transmission method and a transmission device for radio signals that support power saving.

Related Art

At present, Narrow Band Internet of Things (NB-IOT) based on power-saving requirements is being discussed in the 3rd Generation Partner Project (3GPP). When lots of NB-IOT devices exist under the coverage of a base station, in order to achieve the purpose of power saving, one mainstream idea is to avoid frequently starting a baseband processing function of the NB-IOT device. Therefore, Wake-Up Signal (WUS) is put forward. The WUS is configured to indicate whether a User Equipment (UE) needs to perform subsequent physical layer channel decoding. If the UE does not find the WUS, the UE is still in an idle mode.

Compared with traditional physical layer flows, the WUS can effectively reduce the number of times and the frequency of the baseband processing of the UE, thereby achieving the effect of power saving. Correspondingly, new relevant designs based on WUS need to be introduced.

SUMMARY

The inventor finds through researches that the design of WUS needs to take the Paging Frame (PF) and Paging Occasion (PO) of the UE into account and that establishing a one-to-one correspondence between a WUS and a PO/PF is a simple and direct scheme. However, considering that in the future the number of UEs appearing under the coverage of one base station or under one Track Area (TA) may be at the order of tens of thousands, even hundreds of thousands. According to the current definitions of the PF and PO, the position of the PF and PO of a UE is related to a remainder of the International Mobile Subscriber Identity (IMSI) of the UE modulo 1024, and, under one corresponding cell, there will be a large number of UEs belonging to one PO simultaneously. Therefore, the above one-to-one correspondence can still cause a problem that a large number of UEs are woken up at a time, consequently, unnecessary baseband processing and power waste are caused.

In view of the above design, the present disclosure provides a solution. The embodiments of the UE of the present disclosure and the characteristics in the embodiments may be applied to the base station, and vice versa, if no conflict is caused. The embodiments of the present disclosure and the characteristics in the embodiments may be arbitrarily and mutually combined if no conflict is caused.

The present disclosure provides a method in a UE for power saving. The method includes the following steps of:

determining a first time-frequency resource set and K1 signature sequences; and monitoring the K1 signature sequences in the first time-frequency resource set.

Herein, if any one of the K1 signature sequences is found in the first time-frequency resource set, the UE is woken up; the K1 signature sequences are used for generating K1 radio signals respectively; the first time-frequency resource set is one of K2 candidate time-frequency resource sets; K1 and K2 are positive integers respectively; and at least one of K1 and K2 is greater than 1.

In one embodiment, the above method has the following benefits: through the design that "the K1 signature sequences are determined, and, if any one of the K1 signature sequences is found in the first time-frequency resource set, the UE is woken up", the base station selects one signature sequence from the K1 signature sequences to effectively control the number of UEs to wake up. Therefore, the situation that too many UEs are woken up at a time is avoided and terminal power is saved.

In one embodiment, the above method has the following benefits: through the design of the K2 candidate time-frequency resource sets and the design that each candidate time-frequency resource set corresponds to a terminal group, the number of UEs to wake up can be effectively controlled by distinguishing the time-frequency resources. Therefore, the situation that too many UEs are woken up at a time is avoided and terminal power is saved.

In one embodiment, the above method is characterized in that: K1 is greater than 1, the K1 signature sequences correspond to K1 first-type terminal groups respectively, and the K1 first-type terminal groups all include the UE; and one of the K1 radio signals is transmitted in the first time-frequency resource set.

In one embodiment, the above method has the following benefits: the K1 first-type terminal groups all include the UE; when the base station needs to wake up the UE, any one of the K1 signature sequences is used to wake up the UE.

In one embodiment, the above method has another benefit as follows: the K1 first-type terminal groups correspond to K1 kinds of terminal groups having different numbers of terminals, and the base station divides, in advance, all the terminals corresponding to one PO and PF into K1 different kinds of groups, so that the base station can determine a corresponding first-type terminal group according to the number and type of the terminals actually needing to wake up, and determine which one of the K1 signature sequences is transmitted.

In one embodiment, the above method has yet another benefit as follows: one of the K1 radio signals is transmitted in the first time-frequency resource set, and no additional resource will be consumed to transmit the WUS when the K1 first-type terminal groups are introduced.

According to one aspect of the present disclosure, the above method is characterized in that: K2 is greater than 1, the K2 candidate time-frequency resource sets are one-to-one corresponding to K2 second-type terminal groups, only one given second-type terminal group of the K2 second-type terminal groups includes the UE, and the given second-type terminal group corresponds to the first time-frequency resource set.

In one embodiment, the above method has the following benefits: only one given second-type terminal group of the K2 second-type terminal groups includes the UE, and the UE monitors the signature sequence only on the first time-frequency resource set corresponding to the given second-type terminal group, thereby reducing the complexity of the UE.

In one embodiment, the above method has another benefit as follows: all the terminals corresponding to one PO and PF are divided into the K2 second-type terminal groups, and then a corresponding candidate time-frequency resource set is selected according to the second-type terminal group to which the terminal actually needing to wake up belongs. Therefore, the situation that too many unnecessary terminals are woken up at a time is avoided.

According to one aspect of the present disclosure, the above method is characterized in that: at least one of {the K1 signature sequences, the position of the first time-frequency resource set in the K2 candidate time-frequency resource sets} is related to the ID (Identity) of the UE.

In one embodiment, the above method has the following benefits: a relationship is established between the K1 signature sequences and the ID of the UE, then, a relationship is established between the K1 signature sequences and the PF and PO of the UE, and the UE follows the paging process as far as possible when receiving a WUS, so that the complexity of system implementation is simplified.

According to one aspect of the present disclosure, the above method includes the following step of:
receiving first information.

Herein, the first information is used for determining at least one of {the K1 signature sequences, the K2 candidate time-frequency resource sets}.

In one embodiment, the above method has the following benefits: the UE receives, in advance, configuration information used for WUS from the base station, that is, the first information, to facilitate the operation of subsequently receiving WUS.

According to one aspect of the present disclosure, the above method includes the following steps of:
receiving a second signaling in a second time-frequency resource set; and
receiving a first radio signal in a third time-frequency resource set.

Herein, the UE is woken up, the second signaling is a physical layer signaling, the second signaling includes configuration information for the first radio signal, and the configuration information includes at least one of {occupied time domain resource, occupied frequency domain resource, modulation and coding scheme}; the first radio signal includes the ID of the UE; a logical channel corresponding to the first radio signal is a paging control channel; and the K2 candidate time-frequency resource sets are related to at least one of {the second time-frequency resource set, the third time-frequency resource set}.

In one embodiment, the above method has the following benefits: after the UE receives the wakeup signal, the UE begins to receive a paging channel, thereby beginning the subsequent operation of physical layer.

The present disclosure provides a method in a base station for power saving. The method includes the following steps of:
determining a first time-frequency resource set and K1 signature sequences; and
transmitting a target signature sequence in the first time-frequency resource set.

Herein, the target signature sequence is one of the K1 signature sequences; a receiver of the target signature sequence includes a first terminal, and, if the target signature sequence is found in the first time-frequency resource set, the first terminal is woken up; the K1 signature sequences are used for generating K1 radio signals respectively; the first time-frequency resource set is one of K2 candidate time-frequency resource sets; K1 and K2 are positive integers respectively; and at least one of K1 and K2 is greater than 1.

According to one aspect of the present disclosure, the above method is characterized in that: K1 is greater than 1, the K1 signature sequences correspond to K1 first-type terminal groups respectively, and the K1 first-type terminal groups all include the first terminal; and one of the K1 radio signals is transmitted in the first time-frequency resource set.

According to one aspect of the present disclosure, the above method is characterized in that: K2 is greater than 1, the K2 candidate time-frequency resource sets are one-to-one corresponding to K2 second-type terminal groups, only one given second-type terminal group of the K2 second-type terminal groups includes the first terminal, and the given second-type terminal group corresponds to the first time-frequency resource set.

According to one aspect of the present disclosure, the above method is characterized in that: at least one of {the K1 signature sequences, the position of the first time-frequency resource set in the K2 candidate time-frequency resource sets} is related to the ID of the first terminal.

According to one aspect of the present disclosure, the above method includes the following step of:
transmitting first information.

Herein, the first information is used for determining at least one of {the K1 signature sequences, the K2 candidate time-frequency resource sets}.

According to one aspect of the present disclosure, the above method includes the following steps of:
transmitting a second signaling in a second time-frequency resource set; and
transmitting a first radio signal in a third time-frequency resource set.

Herein, the first terminal is woken up, the second signaling is a physical layer signaling, the second signaling includes configuration information for the first radio signal, and the configuration information includes at least one of {occupied time domain resource, occupied frequency domain resource, modulation and coding scheme}; the first radio signal includes the ID of the first terminal; a logical channel corresponding to the first radio signal is a paging control channel; and the K2 candidate time-frequency resource sets are related to at least one of {the second time-frequency resource set, the third time-frequency resource set}.

The present disclosure provides a UE for power saving. The UE includes:
a first receiver module, to determine a first time-frequency resource set and K1 signature sequences, and to monitor the K1 signature sequences in the first time-frequency resource set.

Herein, if any one of the K1 signature sequences is found in the first time-frequency resource set, the UE is woken up; the K1 signature sequences are used for generating K1 radio signals respectively; the first time-frequency resource set is one of K2 candidate time-frequency resource sets; K1 and K2 are positive integers respectively; and at least one of K1 and K2 is greater than 1.

In one embodiment, the above UE for power saving is characterized in that: K1 is greater than 1, the K1 signature sequences correspond to K1 first-type terminal groups respectively, and the K1 first-type terminal groups all include the UE; and one of the K1 radio signals is transmitted in the first time-frequency resource set.

In one embodiment, the above UE for power saving is characterized in that: K2 is greater than 1, the K2 candidate time-frequency resource sets are one-to-one corresponding to K2 second-type terminal groups, only one given second-type terminal group of the K2 second-type terminal groups includes the UE, and the given second-type terminal group corresponds to the first time-frequency resource set.

In one embodiment, the above UE for power saving is characterized in that: at least one of {the K1 signature sequences, the position of the first time-frequency resource set in the K2 candidate time-frequency resource sets} is related to the ID of the UE.

In one embodiment, the above UE for power saving is characterized in that: the first receiver module further receives first information, and the first information is used for determining at least one of {the K1 signature sequences, the K2 candidate time-frequency resource sets}.

In one embodiment, the above UE for power saving includes:

a second receiver module, to receive a second signaling in a second time-frequency resource set, and to receive a first radio signal in a third time-frequency resource set.

Herein, the UE is woken up, the second signaling is a physical layer signaling, the second signaling includes configuration information for the first radio signal, and the configuration information includes at least one of {occupied time domain resource, occupied frequency domain resource, modulation and coding scheme}; the first radio signal includes the ID of the UE; a logical channel corresponding to the first radio signal is a paging control channel; and the K2 candidate time-frequency resource sets are related to at least one of {the second time-frequency resource set, the third time-frequency resource set}.

The present disclosure provides a base station device for power saving. The base station includes:

a first transmitter module, to determine a first time-frequency resource set and K1 signature sequences, and to transmit a target signature sequence in the first time-frequency resource set.

Herein, the target signature sequence is one of the K1 signature sequences; a receiver of the target signature sequence includes a first terminal, and, if the target signature sequence is found in the first time-frequency resource set, the first terminal is woken up; the K1 signature sequences are used for generating K1 radio signals respectively; the first time-frequency resource set is one of K2 candidate time-frequency resource sets; K1 and K2 are positive integers respectively; and at least one of K1 and K2 is greater than 1.

In one embodiment, the base station device for power saving is characterized in that: K1 is greater than 1, the K1 signature sequences correspond to K1 first-type terminal groups respectively, and the K1 first-type terminal groups all include the first terminal; and one of the K1 radio signals is transmitted in the first time-frequency resource set.

In one embodiment, the base station device for power saving is characterized in that: K2 is greater than 1, the K2 candidate time-frequency resource sets are one-to-one corresponding to K2 second-type terminal groups, only one given second-type terminal group of the K2 second-type terminal groups includes the first terminal, and the given second-type terminal group corresponds to the first time-frequency resource set.

In one embodiment, the base station device for power saving is characterized in that: at least one of {the K1 signature sequences, the position of the first time-frequency resource set in the K2 candidate time-frequency resource sets} is related to the ID of the first terminal.

In one embodiment, the base station device for power saving is characterized in that: the first transmitter module further transmits first information; and the first information is used for determining at least one of {the K1 signature sequences, the K2 candidate time-frequency resource sets}.

In one embodiment, the base station device for power saving includes:

a second transmitter module, to transmit a second signaling in a second time-frequency resource set, and to transmit a first radio signal in a third time-frequency resource set.

Herein, the first terminal is woken up, the second signaling is a physical layer signaling, the second signaling includes configuration information for the first radio signal, and the configuration information includes at least one of {occupied time domain resource, occupied frequency domain resource, modulation and coding scheme}; the first radio signal includes the ID of the first terminal; a logical channel corresponding to the first radio signal is a paging control channel; and the K2 candidate time-frequency resource sets are related to at least one of {the second time-frequency resource set, the third time-frequency resource set}.

In one embodiment, compared with traditional schemes, the present disclosure has the following benefits.

Through the design that "the K1 signature sequences are determined, and, if any one of the K1 signature sequences is found in the first time-frequency resource set, the UE is woken up", the base station selects one signature sequence from the K1 signature sequences to effectively control the number of UEs to wake up. Therefore, the situation that too many UEs are woken up at a time is avoided and terminal power is saved.

Through the design of the K2 candidate time-frequency resource sets and the design that each candidate time-frequency resource set corresponds to a terminal group, the number of UEs to wake up can be effectively controlled by distinguishing the time-frequency resources. Therefore, the situation that too many UEs are woken up at a time is avoided and terminal power is saved.

Through a predesign, the K1 first-type terminal groups correspond to K1 kinds of terminal groups having different numbers of terminals, and the base station divides, in advance, all the terminals corresponding to one PO and PF into K1 different kinds of groups, so that the base station can determine a corresponding first-type terminal group according to the number and type of the terminals actually needing to wake up, and determine which one of the K1 signature sequences is transmitted.

All the terminals corresponding to one PO and PF are divided into the K2 second-type terminal groups, and then a corresponding candidate time-frequency resource set is selected according to the second-type terminal group to which the terminal actually needing to wake up belongs. Therefore, the situation that too many unnecessary terminals are woken up at a time is avoided.

BRIEF DESCRIPTION OF THE DRAWINGS

Other features, purposes and advantages of the present disclosure will become more apparent from the detailed description of non-restrictive embodiments taken in conjunction with the following drawings.

DESCRIPTION OF THE EMBODIMENTS

The technical scheme of the present disclosure is described below in further detail in conjunction with the drawings. It should be noted that the embodiments in the present disclosure and the characteristics of the embodiments may be arbitrarily combined if no conflict is caused.

Embodiment 1

Figure 1:
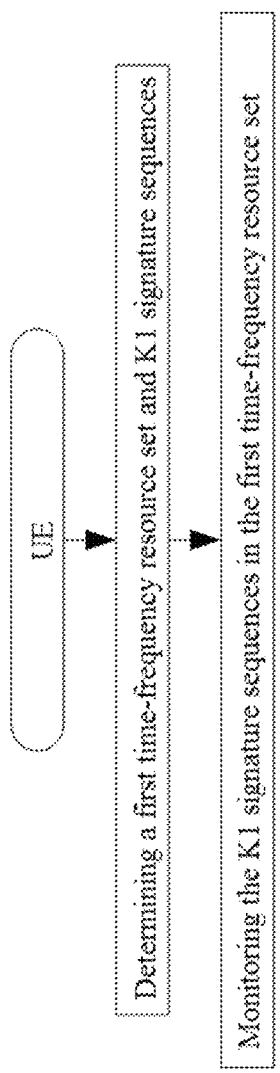
FIG. 1 is a flowchart illustrating the monitoring of K1 signature sequences according to one embodiment of the present disclosure.

Embodiment 1 illustrates an example of a flowchart of the monitoring of K1 signature sequences, as shown in FIG. 1.

In Embodiment 1, the UE of the present disclosure first determines a first time-frequency resource set and K1 signature sequences, and then monitors the K1 signature sequences in the first time-frequency resource set; if any one of the K1 signature sequences is found in the first time-frequency resource set, the UE is woken up; the K1 signature sequences are used for generating K1 radio signals respectively; the first time-frequency resource set is one of K2 candidate time-frequency resource sets; K1 and K2 are positive integers respectively; and at least one of K1 and K2 is greater than 1.

In one subembodiment, monitoring the K1 signature sequences refers to: receiving a first reception sequence in the first time-frequency resource set, and calculating the correlation between the first reception sequence and each signature sequence of the K1 signature sequences; if the correlation is not less than a specific threshold, the UE considers that the corresponding signature sequence is found.

In one subembodiment, a signal obtained after a radio signal received in the first time-frequency resource set passes through an Analog-to-Digital Converter (ADC) is used for determining the first reception sequence.

In one subembodiment, if none of the K1 signature sequences is found in the first time-frequency resource set, the UE is not woken up.

In one subembodiment, the UE being woken up includes: the UE enables a baseband receiving function.

In one subembodiment, when the UE monitors the K1 signature sequences in the first time-frequency resource set, the UE is in an Unconnected state in a cellular network.

In one subembodiment, the Unconnected state in the present disclosure corresponds to a Radio Resource Control (RRC) Idle state, or the Unconnected state in the present disclosure corresponds to an RRC Inactive state.

In one subembodiment, the UE being woken up includes: the UE prepares to process a subsequent baseband signal.

In one subembodiment, the UE being woken up includes: the UE keeps the baseband receiving function enabled.

In one subembodiment, the UE being woken up includes: the UE will not enter a sleeping state in a following given time interval.

In one subembodiment, the K1 radio signals correspond to K1 WUSs respectively, and one of the K1 WUSs is transmitted in the first time-frequency resource set.

In one subembodiment, the signature sequence is one of {Zadoff-Chu sequence, pseudorandom sequence}.

In one subembodiment, the first time-frequency resource set occupies a positive integer number of Resource Elements (REs).

In one subembodiment, the candidate time-frequency resource set occupies a positive integer number of REs.

Embodiment 2

Figure 2:
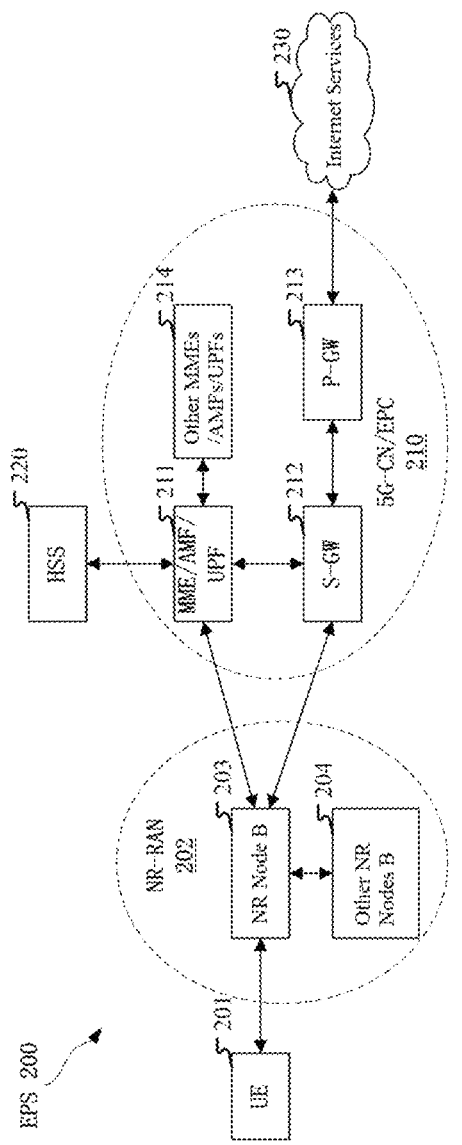
FIG. 2 is a diagram illustrating a network architecture according to one embodiment of the present disclosure.

Embodiment 2 illustrates an example of a diagram of a network architecture, as shown in FIG. 2.

Embodiment 2 illustrates an example of a diagram of a network architecture according to the present disclosure, as shown in FIG. 2. FIG. 2 is a diagram illustrating a system network architecture 200 of NR 5G Long-Term Evolution (LTE), Long-Term Evolution Advanced (LTE-A). The NR 5G or LTE network architecture 200 may be called an Evolved Packet System (EPS) 200 or some other appropriate terms. The EPS 200 may include one or more UEs 201, an NG-RAN 202, a 5G-Core Network/Evolved Packet Core (5G-CN/EPC) 210, a Home Subscriber Server (HSS) 220 and an Internet Service 230. Herein, the EPS may be interconnected with other access networks. For simple description, the entities/interfaces are not shown. As shown in FIG. 2, the EPS provides packet switching services. Those skilled in the art are easy to understand that various concepts presented throughout the present disclosure can be extended to networks providing circuit switching services or other cellular networks. The NG-RAN includes an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Basic Service Set (BSS), an Extended Service Set (ESS), a Transmitter Receiver Point (TRP) or some other appropriate terms. The gNB 203 provides an access point of the 5G-CN/EPC 210 for the UE 201. Examples of UE 201 include cellular phones, smart phones, Session Initiation Protocol (SIP) phones, laptop computers, Personal Digital Assistants (PDAs), Satellite Radios, non-ground base station communications, Satellite mobile communications, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5G-CN/EPC 210 via an S1/NG interface. The 5G-CN/EPC 210 includes an MME/AMF/UPF 211, other MMEs/AMFs/ UPFs 214, a Service Gateway (S-GW) 212 and a Packet Data Network Gateway (P-GW) 213. The MME/AMF/UPF 211 is a control node for processing a signaling between the UE 201 and the 5G-CN/EPC 210. Generally, the MME/ AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including Internet, Intranet, IP Multimedia Subsystems (IMSs) and Packet Switching Streaming Services (PSSs).

In one subembodiment, the UE 201 corresponds to the UE in the present disclosure.

In one subembodiment, the gNB 203 corresponds to the base station in the present disclosure.

In one subembodiment, the UE 201 supports power-saving physical layer processing.

In one subembodiment, the gNB 203 supports terminal side power-saving physical layer processing.

In one subembodiment, the UE 201 is an NB-IOT terminal.

In one subembodiment, the gNB 203 supports NB-IOT services.

Embodiment 3

Figure 3:
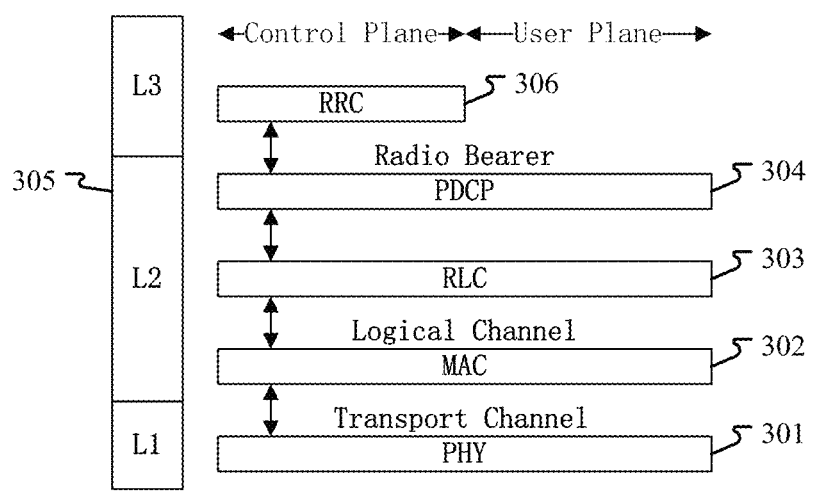
FIG. 3 is a diagram illustrating an embodiment of a radio protocol architecture of a user plane and a control plane according to one embodiment of the present disclosure.

Embodiment 3 illustrates an embodiment of a radio protocol architecture of a user plane and a control plane according to the present disclosure, as shown in FIG. 3.

FIG. 3 is a diagram illustrating an embodiment of a radio protocol architecture of a user plane and a control plane. In FIG. 3, the radio protocol architecture of a UE and a gNB is represented by three layers, which are a layer 1, a layer 2 and a layer 3 respectively. The layer 1 (L1) 301 is the lowest layer and performs signal processing functions of the PHY layer. The layer 1 is called PHY 301 in this paper. The layer 2 (L2) 305 is above the PHY 301, and is in charge of the link between the UE and the gNB via the PHY 301. In the user plane, the L2 305 includes a Medium Access Control (MAC) sublayer 302, a Radio Link Control (RLC) sublayer 303, and a Packet Data Convergence Protocol (PDCP) sublayer 304. All the three sublayers terminate at the gNB of the network side. Although not described in FIG. 3, the UE may include several higher layers above the L2 305, such as a network layer (i.e. IP layer) terminated at a P-GW of the network side and an application layer terminated at the other side of the connection (i.e. a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a packet to as to compensate the disordered receiving caused by Hybrid Automatic Repeat Request (HARQ). The MAC sublayer 302 provides multiplexing between logical channels and transport channels. The MAC sublayer 302 is also responsible for allocating between UEs various radio resources (i.e., resource block) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also includes a Radio Resource Control (RRC) sublayer 306 in the layer 3 (L3). The RRC sublayer 306 is responsible for acquiring radio resources (i.e. radio bearer) and configuring the lower layers using an RRC signaling between the gNB and the UE.

In one subembodiment, the radio protocol architecture in FIG. 3 is applicable to the UE in the present disclosure.

In one subembodiment, the radio protocol architecture in FIG. 3 is applicable to the base station in the present disclosure.

In one subembodiment, the K1 radio signals in the present disclosure are generated by the PHY 301.

In one subembodiment, the first information in the present disclosure is generated by the RRC sublayer 306.

In one subembodiment, the second signaling in the present disclosure is generated by the RLC sublayer 303.

In one subembodiment, the first radio signal in the present disclosure is generated by the RLC sublayer 303.

In one subembodiment, the second signaling in the present disclosure is generated by the RRC sublayer 306.

In one subembodiment, the first radio signal in the present disclosure is generated by the RRC sublayer 306.

Embodiment 4

Figure 4:
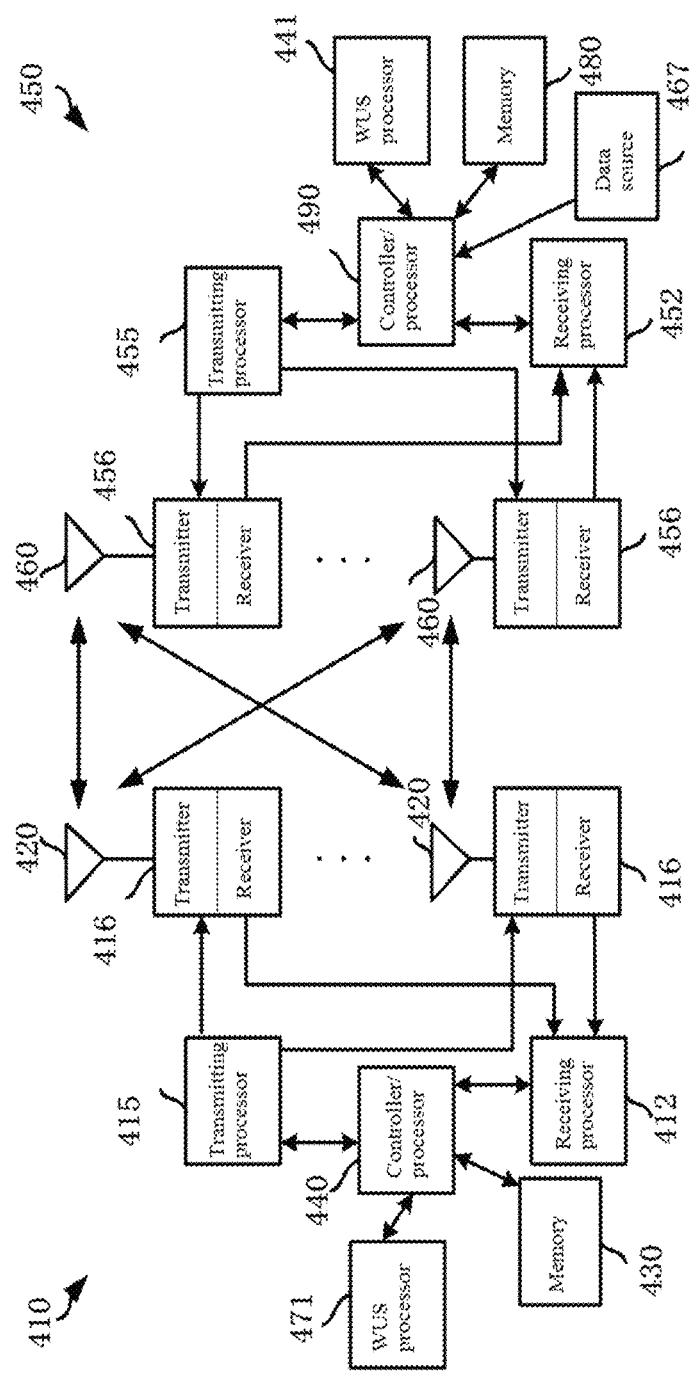
FIG. 4 is a diagram illustrating an evolved node B and a given UE according to one embodiment of the present disclosure.

Embodiment 4 illustrates a diagram of an evolved node B and a given UE according to the present disclosure, as shown in FIG. 4. FIG. 4 is a block diagram of a gNB 410 in communication with a UE 450 in an access network.

The base station device 410 includes a controller/processor 440, a memory 430, a receiving processor 412, a transmitting processor 415, a WUS processor 471, a transmitter/receiver 416 and an antenna 420.

The UE 450 includes a controller/processor 490, a memory 480, a data source 467, a transmitting processor 455, a receiving processor 452, a WUS processor 441, an interactive device 442, a transmitter/receiver 456 and an antenna 460.

In Downlink (DL) transmission, processes relevant to the base station device 410 include the following.

A packet from a higher layer is provided to the controller/ processor 440. The controller/processor 440 provides header compression, encryption, packet segmentation and reordering, multiplexing and de-multiplexing between a logical channel and a transport channel, to implement the L2 protocol used for the user plane and the control plane. The packet from a higher layer may include data or control information, for example, Downlink Shared Channel (DL-SCH).

The controller/processor 440 is connected to the memory 430 that stores program code and data. The memory 430 may be a computer readable medium.

The controller/processor 440 includes a scheduling unit for a transmission requirement, and the scheduling unit is configured to schedule an aerial resource corresponding to the transmission requirement.

The WUS processor 471 determines a first time-frequency resource set and K1 signature sequences, and determines to transmit a target signature sequence in the first time-frequency resource set; and transmits the result to the controller/processor 440.

The transmitting processor 415 receives a bit stream output from the controller/processor 440, and performs signal transmitting processing functions of an L1 layer (that is, PHY), including encoding, interleaving, scrambling, modulation, power control/allocation, generation of physical layer control signaling (including PBCH, PDCCH, PHICH, PCFICH, reference signal), etc.

The transmitter 416 is configured to convert the baseband signal provided by the transmitting processor 415 into a radio-frequency signal and transmit the radio-frequency signal via the antenna 420. Each transmitter 416 performs sampling processing on respective input symbol streams to obtain respective sampled signal streams. Each transmitter 416 performs further processing (for example, digital-to-analogue conversion, amplification, filtering, up conversion, etc.) on respective sampled streams to obtain a downlink signal.

In DL transmission, processes relevant to the UE 450 include the following.

The receiver 456 is configured to convert a radio-frequency signal received via the antenna 460 into a baseband signal and provide the baseband signal to the receiving processor 452.

The receiving processor 452 performs signal receiving processing functions of an L1 layer (that is, PHY), including decoding, de-interleaving, descrambling, demodulation, extraction of physical layer control signaling, etc.

The WUS processor 441 determines a first time-frequency resource set and K1 signature sequences, and determines to monitor the K1 signature sequences in the first time-frequency resource set; and transmits the result to the controller/processor 490.

The controller/processor 490 receives a bit stream output from the receiving processor 452, and provides header decompression, decryption, packet segmentation and reordering, multiplexing and de-multiplexing between a logical channel and a transport channel, to implement the L2 protocol used for the user plane and the control plane.

The controller/processor 490 is connected to the memory 480 that stores program code and data. The memory 480 may be a computer readable medium.

In one subembodiment, the UE 450 device includes at least one processor and at least one memory. The at least one memory includes computer program codes. The at least one memory and the computer program codes are configured to be used in collaboration with the at least one processor. The UE 450 device at least determines a first time-frequency resource set and K1 signature sequences, and monitors the K1 signature sequences in the first time-frequency resource set; if any one of the K1 signature sequences is found in the first time-frequency resource set, the UE 450 is woken up; the K1 signature sequences are used for generating K1 radio signals respectively; the first time-frequency resource set is one of K2 candidate time-frequency resource sets; K1 and K2 are positive integers respectively; and at least one of K1 and K2 is greater than 1.

In one subembodiment, the UE 450 includes a memory that stores a computer readable instruction program. The computer readable instruction program generates an action when executed by at least one processor. The action includes determining a first time-frequency resource set and K1 signature sequences, and monitoring the K1 signature sequences in the first time-frequency resource set; if any one of the K1 signature sequences is found in the first time-frequency resource set, the UE 450 is woken up; the K1 signature sequences are used for generating K1 radio signals respectively; the first time-frequency resource set is one of K2 candidate time-frequency resource sets; K1 and K2 are positive integers respectively; and at least one of K1 and K2 is greater than 1.

In one subembodiment, the gNB 410 device includes at least one processor and at least one memory. The at least one memory includes computer program codes. The at least one memory and the computer program codes are configured to be used in collaboration with the at least one processor. The gNB 410 at least determines a first time-frequency resource set and K1 signature sequences, and transmits a target signature sequence in the first time-frequency resource set; the target signature sequence is one of the K1 signature sequences; a receiver of the target signature sequence includes a first terminal, and, if the target signature sequence is found in the first time-frequency resource set, the first terminal is woken up; the K1 signature sequences are used for generating K1 radio signals respectively; the first time-frequency resource set is one of K2 candidate time-frequency resource sets; K1 and K2 are positive integers respectively; and at least one of K1 and K2 is greater than 1.

In one subembodiment, the gNB 410 includes a memory that stores a computer readable instruction program. The computer readable instruction program generates an action when executed by at least one processor. The action includes: determining a first time-frequency resource set and K1 signature sequences, and transmitting a target signature sequence in the first time-frequency resource set; the target signature sequence is one of the K1 signature sequences; a receiver of the target signature sequence includes a first terminal, and, if the target signature sequence is found in the first time-frequency resource set, the first terminal is woken up; the K1 signature sequences are used for generating K1 radio signals respectively; the first time-frequency resource set is one of K2 candidate time-frequency resource sets; K1 and K2 are positive integers respectively; and at least one of K1 and K2 is greater than 1.

In an affiliated embodiment of the above two subembodiments, the first terminal is the UE 450.

In one subembodiment, the UE 450 corresponds to the UE in the present disclosure.

In one subembodiment, the gNB 410 corresponds to the base station in the present disclosure.

In one subembodiment, at least the former two of the receiver 456, the receiving processor 452, and the controller/processor 490 are used for monitoring the K1 signature sequences in the first time-frequency resource set.

In one subembodiment, at least the former two of the receiver 456, the receiving processor 452, and the controller/processor 490 are used for receiving first information.

In one subembodiment, at least the former two of the receiver 456, the receiving processor 452, and the controller/processor 490 are used for receiving a second signaling in a second time-frequency resource set.

In one subembodiment, at least the former two of the receiver 456, the receiving processor 452, and the controller/processor 490 are used for receiving a first radio signal in a third time-frequency resource set.

In one subembodiment, the WUS processor 441 is used for determining the first time-frequency resource set and the K1 signature sequences.

In one subembodiment, the WUS processor 441 is used for determining to monitor the K1 signature sequences in the first time-frequency resource set.

In one subembodiment, at least the former two of the transmitter 416, the transmitting processor 415, and the controller/processor 440 are used for transmitting the target signature sequence in the first time-frequency resource set.

In one subembodiment, at least the former two of the transmitter 416, the transmitting processor 415, and the controller/processor 440 are used for transmitting first information.

In one subembodiment, at least the former two of the transmitter 416, the transmitting processor 415, and the controller/processor 440 are used for transmitting a second signaling in a second time-frequency resource set.

In one subembodiment, at least the former two of the transmitter 416, the transmitting processor 415, and the controller/processor 440 are used for transmitting a first radio signal in a third time-frequency resource set.

In one subembodiment, the WUS processor 471 is used for determining the first time-frequency resource set and the K1 signature sequences.

In one subembodiment, the WUS processor 471 is used for determining to transmit the target signature sequence in the first time-frequency resource set.

Embodiment 5

Figure 5:
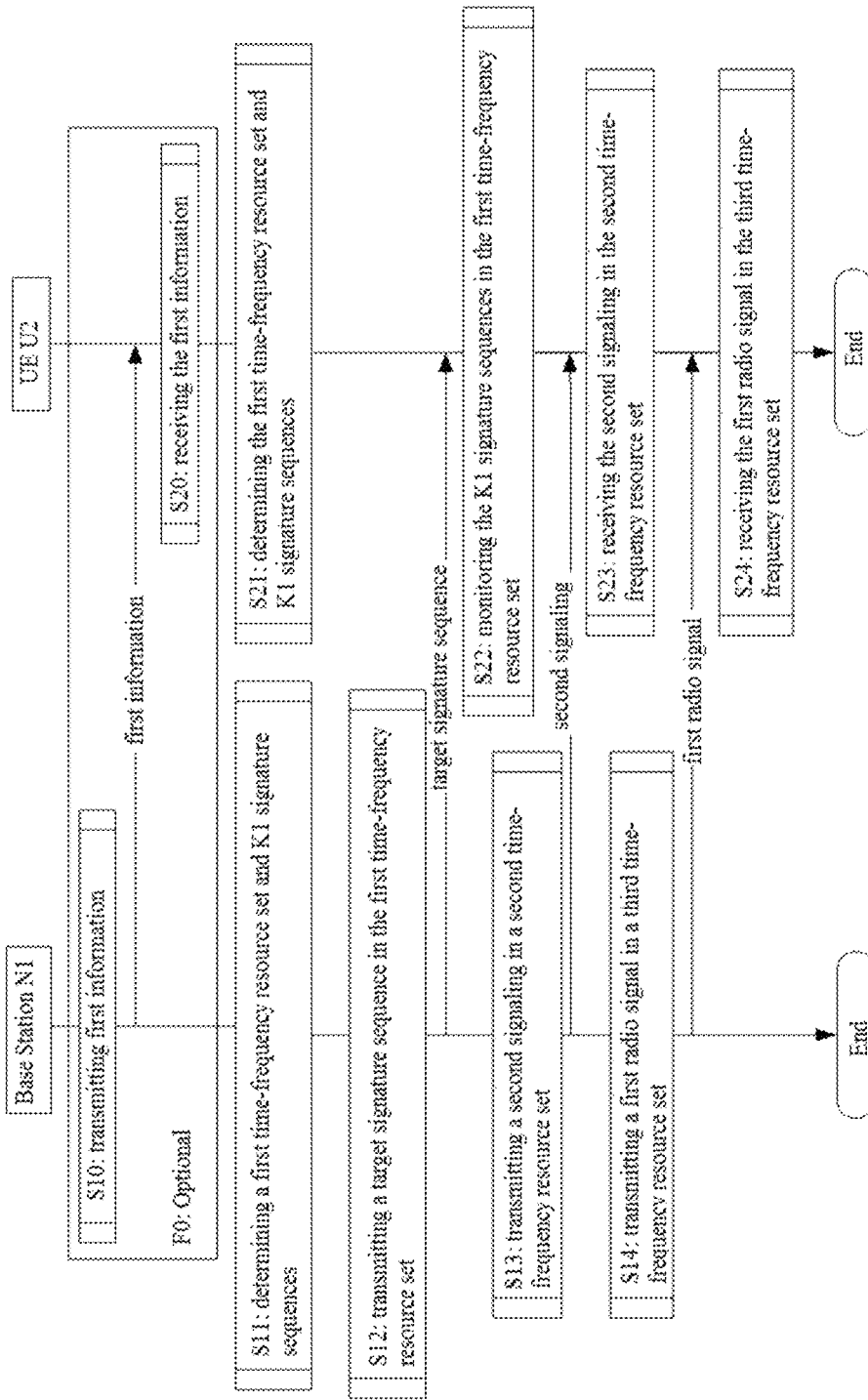
FIG. 5 is a flowchart illustrating the transmission of first information according to one embodiment of the present disclosure.

Embodiment 5 illustrates an example of a flowchart of the transmission of first information, as shown in FIG. 5. In FIG. 5, the base station N1 is a maintenance base station for a serving cell of the UE U2. In FIG. 5, the step shown in box F0 is optional.

The base station N1 transmits first information in S10, determines a first time-frequency resource set and K1 signature sequences in S11, transmits a target signature sequence in the first time-frequency resource set in S12, transmits a second signaling in a second time-frequency resource set in S13, and transmits a first radio signal in a third time-frequency resource set in S14.

The UE U2 receives the first information in S20, determines the first time-frequency resource set and K1 signature sequences in S21, monitors the K1 signature sequences in the first time-frequency resource set in S22, receives the second signaling in the second time-frequency resource set in S23, and receives the first radio signal in the third time-frequency resource set in S24.

In Embodiment 5, if any one of the K1 signature sequences is found in the first time-frequency resource set, the UE U2 is woken up; the K1 signature sequences are used for generating K1 radio signals respectively; the first time-frequency resource set is one of K2 candidate time-frequency resource sets; K1 and K2 are positive integers respectively; and at least one of K1 and K2 is greater than 1; at least one of {the K1 signature sequences, the position of the first time-frequency resource set in the K2 candidate time-frequency resource sets} is related to the ID of the UE U2; the first information is used for determining at least one of {the K1 signature sequences, the K2 candidate time-frequency resource sets}; the UE U2 is woken up, the second signaling is a physical layer signaling, the second signaling includes configuration information for the first radio signal, and the configuration information includes at least one of {occupied time domain resource, occupied frequency domain resource, modulation and coding scheme}; the first radio signal includes the ID of the UE U2; a logical channel corresponding to the first radio signal is a paging control channel; and the K2 candidate time-frequency resource sets are related to at least one of {the second time-frequency resource set, the third time-frequency resource set}.

In one subembodiment, K1 is greater than 1, the K1 signature sequences correspond to K1 first-type terminal groups respectively, and the K1 first-type terminal groups all include the UE; and one of the K1 radio signals is transmitted in the first time-frequency resource set.

In an affiliated embodiment of the above subembodiment, all terminals in the K1 first-type terminal groups correspond to the same paging frame and paging occasion.

In an affiliated embodiment of the above subembodiment, the first time-frequency resource set is one-to-one corresponding to the paging frame and the paging occasion.

In an affiliated embodiment of the above subembodiment, the paging frame in the present disclosure occupies a radio frame in time domain, and the paging occasion in the present disclosure occupies a subframe in time domain.

In an affiliated embodiment of the above subembodiment, the K1 first-type terminal groups includes at least two first-type terminal groups, the at least two first-type terminal groups both include a first terminal, and the first terminal is a terminal other than the UE U2.

In an affiliated embodiment of the above subembodiment, all terminals in the K1 first-type terminal groups are in an Unconnected state in a cellular network.

In one subembodiment, K2 is greater than 1, the K2 candidate time-frequency resource sets are one-to-one corresponding to K2 second-type terminal groups, only one given second-type terminal group of the K2 second-type terminal groups includes the UE U2, and the given second-type terminal group corresponds to the first time-frequency resource set.

In an affiliated embodiment of the above subembodiment, the K2 candidate time-frequency resource sets are orthogonal in at least one of {time domain, frequency domain}.

In an affiliated embodiment of the above subembodiment, K1 is equal to 1.

In an affiliated embodiment of the above subembodiment, in any two second-type terminal groups of the K2 second-type terminal groups, there is no terminal belonging to the any two second-type terminal groups simultaneously.

In an affiliated embodiment of the above subembodiment, all terminals in the K2 second-type terminal groups correspond to the same paging frame and paging occasion.

In an affiliated embodiment of the above subembodiment, the terminals in the K2 second-type terminal groups are predefined to monitor paging information in M time sub-windows of a first time window, and any one of the M time sub-windows is corresponding to the K2 candidate time-frequency resource sets.

In an affiliated embodiment of the above subembodiment, the terminals in the K2 second-type terminal groups are predefined to monitor paging information in M time sub-windows of a first time window, and any one of the M time sub-windows is corresponding to only one of the K2 candidate time-frequency resource sets.

In one subembodiment, the ID of the UE U2 includes at least one of {IMSI, System Architecture Evolution Temporary Mobile Subscriber Identity (S-TMSI), Cell Radio Network Temporary Identifier (C-RNTI)} of the UE U2.

In one subembodiment, the ID of the UE U2 is obtained after one of {IMSI, S-TMSI, C-RNTI} of the UE U2 is subjected to linear operation.

In one subembodiment, the ID of the UE U2 is a reminder of the IMSI of the UE U2 divided by L, wherein L is equal to one of {1024, 2048, 4096, 8192, 16384, 32768}.

In one subembodiment, K1 is equal to 1, a first integer is equal to a remainder of the ID of the UE U2 modulo a given integer, and the first integer is one-to-one corresponding to the signature sequence.

In one subembodiment, K1 is greater than 1, a second integer set includes K1 integers, wherein the K1 integers are equal to remainders of the ID of the UE U2 modulo K1 second-type integers respectively, and the K1 integers included in the second integer set are one-to-one corresponding to the K1 signature sequences respectively.

In one subembodiment, the first information is an RRC signaling.

In one subembodiment, the first information is UE specific.

In one subembodiment, the first information is system information.

In one subembodiment, the first information indicates explicitly the K1 signature sequences.

In one subembodiment, the first information indicates explicitly at least one of {time domain resource, frequency domain resource} occupied by the K2 candidate time-frequency resource sets.

In one subembodiment, the second signaling is used for scheduling paging information, and the first radio signal is the paging information.

In one subembodiment, the second time-frequency resource set and the first time-frequency resource set are related.

In one subembodiment, the third time-frequency resource set and the first time-frequency resource set are related.

In one subembodiment, the K2 candidate time-frequency resource sets being related to at least one of {the second time-frequency resource set, the third time-frequency resource set} refers that: the position of the time-frequency resource occupied by the first time-frequency resource set is used for determining the position of the time-frequency resource occupied by the second time-frequency resource set.

In one subembodiment, the K2 candidate time-frequency resource sets being related to at least one of {the second time-frequency resource set, the third time-frequency resource set} refers that: the position of the time-frequency resource occupied by the first time-frequency resource set is used for determining the position of the time-frequency resource occupied by the third time-frequency resource set.

In one subembodiment, the K2 candidate time-frequency resource sets being related to at least one of {the second time-frequency resource set, the third time-frequency resource set} refers that: the UE U2 is woken up by monitoring the first time-frequency resource set, the UE U2 receives the second signaling in the first paging occasion behind the first time-frequency resource set; and the time domain resource occupied by the second time-frequency resource set belongs to the first paging occasion.

In one subembodiment, the K2 candidate time-frequency resource sets being related to at least one of {the second time-frequency resource set, the third time-frequency resource set} refers that: the second time-frequency resource set belongs to K2 second-type time-frequency resource sets, the index of the first time-frequency resource set in the K2 candidate time-frequency resource sets is used for determining the index of the second time-frequency resource set in the K2 second-type time-frequency resource sets.

In one subembodiment, the K2 candidate time-frequency resource sets being related to at least one of {the second time-frequency resource set, the third time-frequency resource set} refers that: the third time-frequency resource set belongs to K2 third-type time-frequency resource sets, the index of the first time-frequency resource set in the K2 candidate time-frequency resource sets is used for determining the index of the third time-frequency resource set in the K2 third-type time-frequency resource sets.

In one subembodiment, the K1 signature sequences are related to the ID of the UE U2.

In an affiliated embodiment of the above subembodiment, the K1 signature sequences being related to the ID of the UE U2 refers that: the ID of the UE U2 is used for determining that the UE U2 belongs to K1 first-type terminal groups simultaneously, and the K1 first-type terminal groups correspond to the K1 signature sequences respectively.

In one subembodiment, the position of the first time-frequency resource set in the K2 candidate time-frequency resource sets is related to the ID of the UE U2.

In an affiliated embodiment of the above subembodiment, the position refers to a time domain position.

Embodiment 6

Figure 6:
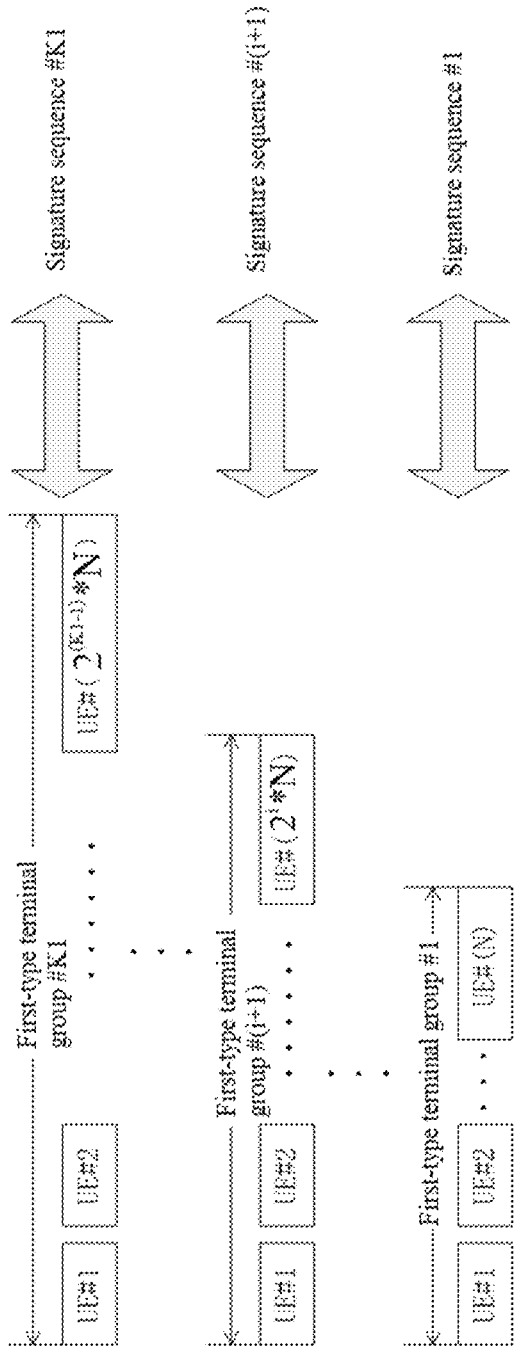
FIG. 6 is a diagram illustrating a relationship between the K1 signature sequences and the UE of the present disclosure according to one embodiment of the present disclosure.

Embodiment 6 illustrates an example of a diagram of a relationship between the K1 signature sequences and the UE of the present disclosure, as shown in FIG. 6. In FIG. 6, the UE #1 corresponds to the UE of the present disclosure, and the K1 signature sequences correspond to the first-type terminal group #1 to the first-type terminal group #K1 in sequence. Herein, the first-type terminal group #(i+1) includes {UE #1, UE #2, . . . UE #($2^i$*N)}, the first-type terminal group #(i+1) corresponds to the signature sequence #(i+1), wherein i is a positive integer not less than 0 but less than K1, and N is a positive integer.

In one subembodiment, i is equal to K1, the results of IDs corresponding to UE #1 to UE #(K1*N) modulo 1024 are equal.

In one subembodiment, the results of IDs corresponding to UE #1 to UE #($2^i$*N) modulo (1024*K1/$2^i$) are equal.

In an affiliated embodiment of the above two subembodiments, the ID is one of {IMSI, S-TMSI, C-RNTI}.

Embodiment 7

Figure 7:
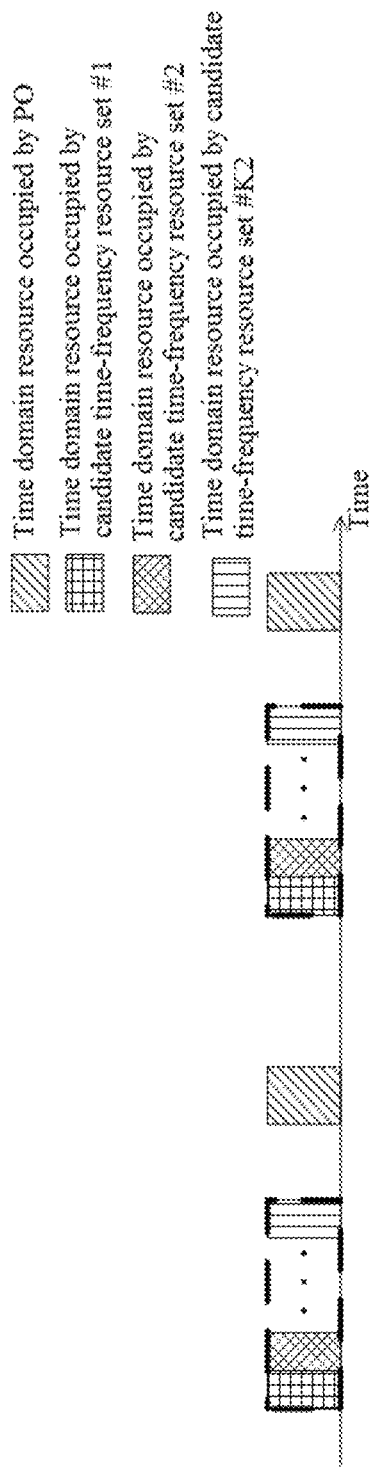
FIG. 7 is a diagram illustrating K2 candidate time-frequency resource sets according to one embodiment of the present disclosure.

Embodiment 7 illustrates an example of a diagram of K2 candidate time-frequency resource sets, as shown in FIG. 7. In FIG. 7, the rectangle filled by slashes corresponds to the PO of the UE of the present disclosure, each PO of the UE corresponds to the K2 candidate time-frequency resource sets of the present disclosure, and the dashes box shown in FIG. 7 corresponds to the time domain resources occupied by the K2 candidate time-frequency resource sets.

In one subembodiment, the time domain resources occupied by the K2 candidate time-frequency resource sets are consecutive.

In one subembodiment, the time domain resources occupied by the K2 candidate time-frequency resource sets are orthogonal.

In one subembodiment, the K2 candidate time-frequency resource sets are one-to-one corresponding to K2 second-type terminal groups, only one given second-type terminal group of the K2 second-type terminal groups includes the UE, and the given second-type terminal group is corresponding to the first time-frequency resource set.

In an affiliated embodiment of the subembodiment, the ID of the UE of the present disclosure belongs to IDs of the given second terminal group, the index of the given second terminal group in the K2 second-type terminal groups is used for determining the index of the first time-frequency resource set in the K2 candidate time-frequency resource sets.

Embodiment 8

Figure 8:
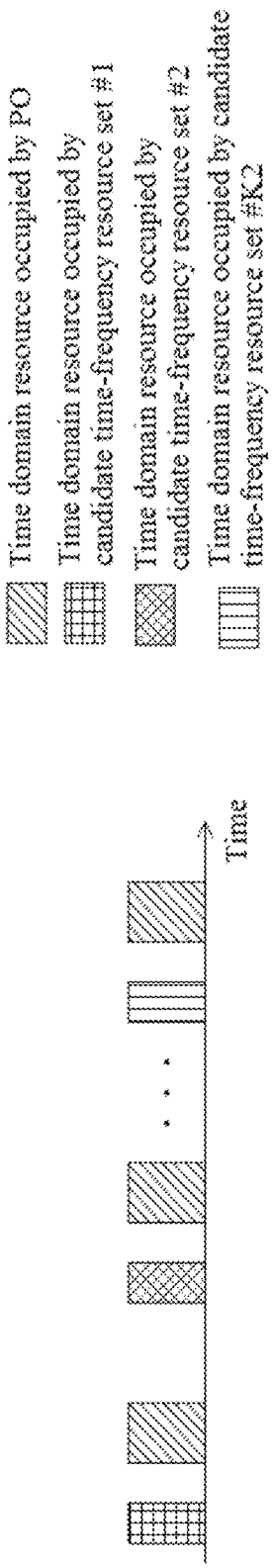
FIG. 8 is a diagram illustrating K2 candidate time-frequency resource sets according to another embodiment of the present disclosure.

Embodiment 8 illustrates an example of another diagram of K2 candidate time-frequency resource sets, as shown in FIG. 8. In FIG. 8, the rectangle filled by slashes corresponds to the PO of the UE of the present disclosure, and each PO of the UE corresponds to at most one candidate time-frequency resource set of the K2 candidate time-frequency resource sets of the present disclosure.

In one subembodiment, the time domain resources occupied by the K2 candidate time-frequency resource sets are discrete.

In one subembodiment, the time domain resources occupied by the K2 candidate time-frequency resource sets are orthogonal.

In one subembodiment, the order of the K2 candidate time-frequency resource sets in time domain is predefined, or is configured through a high layer signaling.

In one subembodiment, the relative position in time domain between the PO and the candidate resource set corresponding to the PO is fixed, or is configured through a high layer signaling.

Embodiment 9

Figure 9:
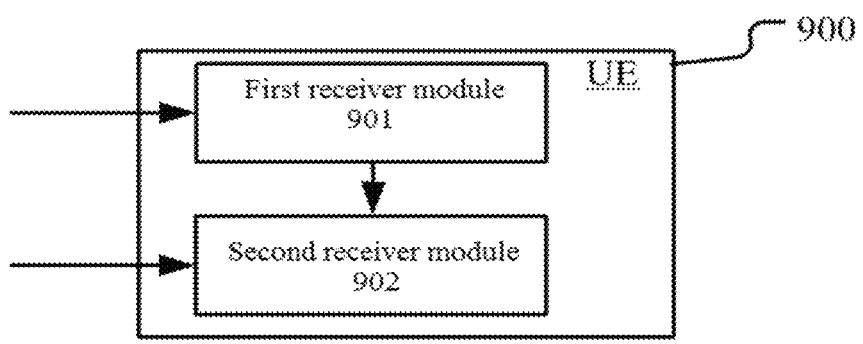
FIG. 9 is a structure block diagram illustrating a processing device in a UE according to one embodiment of the present disclosure.

Embodiment 9 illustrates an example of a structure block diagram of a processing device in a UE, as shown in FIG. 9. In FIG. 9, the processing device 900 of the UE is mainly composed of a first receiver module 901 and a second receiver module 902.

The first receiver module 901 determines a first time-frequency resource set and K1 signature sequences, and monitors the K1 signature sequences in the first time-frequency resource set.

The second receiver module 902 receives a second signaling in a second time-frequency resource set, and receives a first radio signal in a third time-frequency resource set.

In embodiment 9, if any one of the K1 signature sequences is found in the first time-frequency resource set, the UE is woken up; the K1 signature sequences are used for generating K1 radio signals respectively; the first time-frequency resource set is one of K2 candidate time-frequency resource sets; K1 and K2 are positive integers respectively; and at least one of K1 and K2 is greater than 1; at least one of {the K1 signature sequences, the position of the first time-frequency resource set in the K2 candidate time-frequency resource sets} is related to the ID of the UE; the UE is woken up, the second signaling is a physical layer signaling, the second signaling includes configuration information for the first radio signal, and the configuration information includes at least one of {occupied time domain resource, occupied frequency domain resource, modulation and coding scheme}; the first radio signal includes the ID of the UE; a logical channel corresponding to the first radio signal is a paging control channel; and the K2 candidate time-frequency resource sets are related to at least one of {the second time-frequency resource set, the third time-frequency resource set}.

In one subembodiment, K1 is greater than 1, the K1 signature sequences correspond to K1 first-type terminal groups respectively, and the K1 first-type terminal groups all include the UE; and one of the K1 radio signals is transmitted in the first time-frequency resource set.

In one subembodiment, K2 is greater than 1, the K2 candidate time-frequency resource sets are one-to-one corresponding to K2 second-type terminal groups, only one given second-type terminal group of the K2 second-type terminal groups includes the UE, and the given second-type terminal group corresponds to the first time-frequency resource set.

In one subembodiment, the first receiver module 901 further receives first information, and the first information is used for determining at least one of {the K1 signature sequences, the K2 candidate time-frequency resource sets}.

In one subembodiment, the first receiver module 901 includes at least the former two of {the receiver 454, the receiving processor 456, the controller/processor 459} mentioned in Embodiment 4.

In one subembodiment, the second receiver module 902 includes at least the former two of {the receiver 454, the receiving processor 456, the controller/processor 459} mentioned in Embodiment 4.

In one subembodiment, the first receiver module 901 includes the WUS processor 441 mentioned in Embodiment 4.

Embodiment 10

Figure 10:
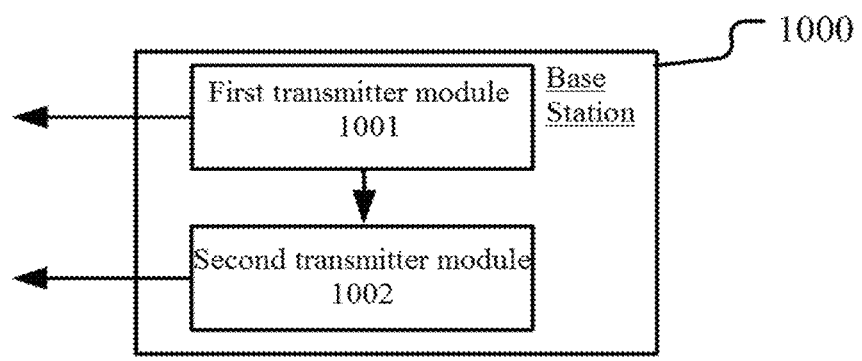
FIG. 10 is a structure block diagram illustrating a processing device in a base station according to one embodiment of the present disclosure.

Embodiment 10 illustrates an example of a structure block diagram of a processing device in a base station device, as shown in FIG. 10. In FIG. 10, the processing device 1000 of the base station device is mainly composed of a first transmitter module 1001 and a second transmitter module 1002.

The first transmitter module 1001 determines a first time-frequency resource set and K1 signature sequences, and transmits a target signature sequence in the first time-frequency resource set.

The second transmitter module 1002 transmits a second signaling in a second time-frequency resource set, and transmits a first radio signal in a third time-frequency resource set.

In Embodiment 10, the target signature sequence is one of the K1 signature sequences; a receiver of the target signature sequence includes a first terminal, and, if the target signature sequence is found in the first time-frequency resource set, the first terminal is woken up; the K1 signature sequences are used for generating K1 radio signals respectively; the first time-frequency resource set is one of K2 candidate time-frequency resource sets; K1 and K2 are positive integers respectively; and at least one of K1 and K2 is greater than 1; at least one of {the K1 signature sequences, the position of the first time-frequency resource set in the K2 candidate time-frequency resource sets} is related to the ID of the first terminal; the first terminal is woken up, the second signaling is a physical layer signaling, the second signaling includes configuration information for the first radio signal, and the configuration information includes at least one of {occupied time domain resource, occupied frequency domain resource, modulation and coding scheme}; the first radio signal includes the ID of the first terminal; a logical channel corresponding to the first radio signal is a paging control channel; and the K2 candidate time-frequency resource sets are related to at least one of {the second time-frequency resource set, the third time-frequency resource set}.

In one subembodiment, K1 is greater than 1, the K1 signature sequences correspond to K1 first-type terminal groups respectively, and the K1 first-type terminal groups all include the first terminal; and one of the K1 radio signals is transmitted in the first time-frequency resource set.

In one subembodiment, K2 is greater than 1, the K2 candidate time-frequency resource sets are one-to-one corresponding to K2 second-type terminal groups, only one given second-type terminal group of the K2 second-type terminal groups includes the first terminal, and the given second-type terminal group corresponds to the first time-frequency resource set.

In one subembodiment, the first transmitter module 1001 further transmits first information; and the first information is used for determining at least one of {the K1 signature sequences, the K2 candidate time-frequency resource sets}.

In one subembodiment, the first transmitter module 1001 includes at least the former two of {the transmitter 416, the transmitting processor 415, the controller/processor 440} mentioned in Embodiment 4.

In one subembodiment, the second transmitter module 1002 includes at least the former two of {the transmitter 416, the transmitting processor 415, the controller/processor 440} mentioned in Embodiment 4.

In one subembodiment, the first transmitter module 1001 includes the WUS processor 471 mentioned in Embodiment 4.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, REID terminals, NB-IOT terminals, Machine Type Communication (MTC) terminals, enhanced MTC (eMTC) terminals, data cards, low-cost mobile phones, low-cost tablet computers, etc. The base station in the present application includes but not limited to macro-cellular base stations, micro-cellular base stations, home base stations, relay base station, gNB, TRP, and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a User Equipment (UE) for power saving, comprising:
determining a first time-frequency resource set and K1 signature sequences; and
monitoring the K1 signature sequences in the first time-frequency resource set;
wherein:
when any one of the K1 signature sequences is found in the first time-frequency resource set, the UE is woken up; the K1 signature sequences are used for generating K1 radio signals respectively; the first time-frequency resource set is one of K2 candidate time-frequency resource sets; K1 and K2 are positive integers respectively;
at least one of K1 and K2 is greater than 1; and when K1 is greater than 1, the K1 signature sequences correspond to K1 first-type terminal groups respectively, the K1 first-type terminal groups all include the UE, and one of the K1 radio signals is transmitted in the first time-frequency resource set; wherein K2 is greater than 1, the K2 candidate time-frequency resource sets are one-to-one corresponding to K2 second-type terminal groups, only one given second-type terminal group of the K2 second-type terminal groups includes the UE, and the given second-type terminal group corresponds to the first time-frequency resource set; the K1 radio signals correspond to K1 Wake Up Signals respectively, and one of the K1 Wake Up Signals is transmitted in the first time-frequency resource set when the UE monitors the K1 signature sequences in the first time-frequency resource set, the UE is in an Unconnected state in a cellular network; the Unconnected state corresponds to a Radio Resource Control (RRC) Idle state, or the Unconnected state corresponds to an RRC Inactive state.

2. The method according to claim 1, further comprising:
receiving first information;
wherein the first information is used for determining at least one of the K1 signature sequences and the K2 candidate time-frequency resource sets.

3. The method according to claim 1, further comprising:
receiving a second signaling in a second time-frequency resource set; and
receiving a first radio signal in a third time-frequency resource set;
wherein the UE is woken up, the second signaling is a physical layer signaling, the second signaling includes configuration information for the first radio signal, and the configuration information includes at least one of an occupied time domain resource, an occupied frequency domain resource, and a modulation and coding scheme; the first radio signal includes an identity of the UE; a logical channel corresponding to the first radio signal is a paging control channel; and the K2 candidate time-frequency resource sets are related to at least one of the second time-frequency resource set and the third time-frequency resource set.

4. A method in a base station for power saving, comprising:
determining a first time-frequency resource set and K1 signature sequences; and
transmitting a target signature sequence in the first time-frequency resource set;
wherein:
the target signature sequence is one of the K1 signature sequences; a receiver of the target signature sequence includes a first terminal, and, when the target signature sequence is found in the first time-frequency resource set, the first terminal is woken up; the K1 signature sequences are used for generating K1 radio signals respectively; the first time-frequency resource set is one of K2 candidate time-frequency resource sets; K1 and K2 are positive integers respectively; at least one of K1 and K2 is greater than 1; and when K1 is greater than 1, the K1 signature sequences correspond to K1 first-type terminal groups respectively, the K1 first-type terminal groups all include the first terminal, and one of the K1 radio signals is transmitted in the first time-frequency resource set; wherein K2 is greater than 1, the K2 candidate time-frequency resource sets are one-to-one corresponding to K2 second-type terminal groups, only one given second-type terminal group of the K2 second-type terminal groups includes the first terminal, and the given second-type terminal group corresponds to the first time-frequency resource set; the K1 radio signals correspond to K1 Wake Up Signals respectively, and one of the K1 Wake Up Signals is transmitted in the first time-frequency resource set when the UE monitors the K1 signature sequences in the first time-frequency resource set, the UE is in an Unconnected state in a cellular network; the Unconnected state corresponds to a Radio Resource Control (RRC) Idle state, or the Unconnected state corresponds to an RRC Inactive state.

5. The method according to claim 4, further comprising: transmitting first information;
wherein the first information is used for determining at least one of the K1 signature sequences and the K2 candidate time-frequency resource sets.

6. The method according to claim 4, further comprising: transmitting a second signaling in a second time-frequency resource set; and
transmitting a first radio signal in a third time-frequency resource set;
wherein the first terminal is woken up, the second signaling is a physical layer signaling, the second signaling includes configuration information for the first radio signal, and the configuration information includes at least one of an occupied time domain resource, an occupied frequency domain resource, and a modulation and coding scheme; the first radio signal includes an identity of the first terminal; a logical channel corresponding to the first radio signal is a paging control channel; and the K2 candidate time-frequency resource sets are related to at least one of the second time-frequency resource set, and the third time-frequency resource set.

7. A User Equipment (UE) for power saving, comprising:
a first receiver, to determine a first time-frequency resource set and K1 signature sequences, and to monitor the K1 signature sequences in the first time-frequency resource set;
wherein:
when any one of the K1 signature sequences is found in the first time-frequency resource set, the UE is woken up; the K1 signature sequences are used for generating K1 radio signals respectively; the first time-frequency resource set is one of K2 candidate time-frequency resource sets; K1 and K2 are positive integers respectively; at least one of K1 and K2 is greater than 1; and when K1 is greater than 1, the K1 signature sequences correspond to K1 first-type terminal groups respectively, and the K1 first-type terminal groups all include the UE; one of the K1 radio signals is transmitted in the first time-frequency resource set; when K2 is greater than 1, the K2 candidate time-frequency resource sets are one-to-one corresponding to K2 second-type terminal groups, only one given second-type terminal group of the K2 second-type terminal groups includes the UE, and the given second-type terminal group corresponds to the first time-frequency resource set; and at least one of the K1 signature sequences and the position of the first time-frequency resource set in the K2 candidate time-frequency resource sets is related to an identity of the UE; the K1 radio signals correspond to K1 Wake Up Signals respectively, and one of the K1 Wake Up Signals is transmitted in the first time-frequency resource set when the UE monitors the K1 signature sequences in the first time-frequency resource set, the UE is in an Unconnected state in a cellular network; the Unconnected state corresponds to a Radio Resource Control (RRC) Idle state, or the Unconnected state corresponds to an RRC Inactive state.

8. The UE according to claim 7, wherein at least one of the K1 signature sequences and the position of the first time-frequency resource set in the K2 candidate time-frequency resource sets is related to an identity of the UE.

9. The UE according to claim 7, wherein the first receiver further receives first information, and the first information is used for determining at least one of the K1 signature sequences and the K2 candidate time-frequency resource sets.

10. The UE according to claim 9, wherein the first information is an RRC signaling, and the first information is configuration information used for Wake Up Signal.

11. The UE according to claim 7, further comprising a second receiver, wherein the second receiver receives a second signaling in a second time-frequency resource set, and the second receiver receives a first radio signal in a third time-frequency resource set; the UE is woken up, the second signaling is a physical layer signaling, the second signaling includes configuration information for the first radio signal, and the configuration information includes at least one of an occupied time domain resource, an occupied frequency domain resource, and a modulation and coding scheme; the first radio signal includes an identity of the UE; a logical channel corresponding to the first radio signal is a paging control channel; and the K2 candidate time-frequency resource sets are related to at least one of the second time-frequency resource set and the third time-frequency resource set.

12. The UE according to claim 7, wherein the signature sequence is Zadoff-Chu sequence or the signature sequence is pseudorandom sequence.

13. A base station device for power saving, comprising:
a first transmitter, to determine a first time-frequency resource set and K1 signature sequences, and to transmit a target signature sequence in the first time-frequency resource set;
wherein:
the target signature sequence is one of the K1 signature sequences; a receiver of the target signature sequence includes a first terminal, and, when the target signature sequence is found in the first time-frequency resource set, the first terminal is woken up; the K1 signature sequences are used for generating K1 radio signals respectively;
the first time-frequency resource set is one of K2 candidate time-frequency resource sets; K1 and K2 are positive integers respectively; at least one of K1 and K2 is greater than 1; when K1 is greater than 1, the K1 signature sequences correspond to K1 first-type terminal groups respectively, and the K1 first-type terminal groups all include the first terminal; and one of the K1 radio signals is transmitted in the first time-frequency resource set; or, when K2 is greater than 1, the K2 candidate time-frequency resource sets are one-to-one corresponding to K2 second-type terminal groups, only one given second-type terminal group of the K2 second-type terminal groups includes the first terminal, and the given second-type terminal group corresponds to the first time-frequency resource set; or at least one of the K1 signature sequences and the position of the first time-frequency resource set in the K2 candidate time-frequency resource sets is related to an identity of the first terminal; the K1 radio signals correspond to K1 Wake Up Signals respectively, and one of the K1 Wake Up Signals is transmitted in the first time-frequency resource set when the first terminal monitors the K1 signature sequences in the first time-frequency resource set, the first terminal is in an Unconnected state in a cellular network; the Unconnected state corresponds to a Radio Resource Control (RRC) Idle state, or the Unconnected state corresponds to an RRC Inactive state.

14. The base station device according to claim 13, wherein at least one of the K1 signature sequences and the position of the first time-frequency resource set in the K2 candidate time-frequency resource sets is related to an identity of the first terminal.

15. The base station device according to claim 13, wherein the first transmitter further transmits first information; and the first information is used for determining at least one of the K1 signature sequences and the K2 candidate time-frequency resource sets.

16. The base station device according to claim 15, wherein the first information is an RRC signaling, and the first information is configuration information used for Wake Up Signal.

17. The base station device according to claim 13, further comprising a second transmitter, wherein the second transmitter transmits a second signaling in a second time-frequency resource set, and the second transmitter transmits a first radio signal in a third time-frequency resource set; the first terminal is woken up, the second signaling is a physical layer signaling, the second signaling includes configuration information for the first radio signal, and the configuration information includes at least one of an occupied time domain resource, an occupied frequency domain resource, and a modulation and coding scheme; the first radio signal includes an identity of the first terminal; a logical channel corresponding to the first radio signal is a paging control channel; and the K2 candidate time-frequency resource sets are related to at least one of the second time-frequency resource set and the third time-frequency resource set.

18. The base station device according to claim 13, wherein the signature sequence is Zadoff-Chu sequence or the signature sequence is pseudorandom sequence.

* * * * *